Figure 1:
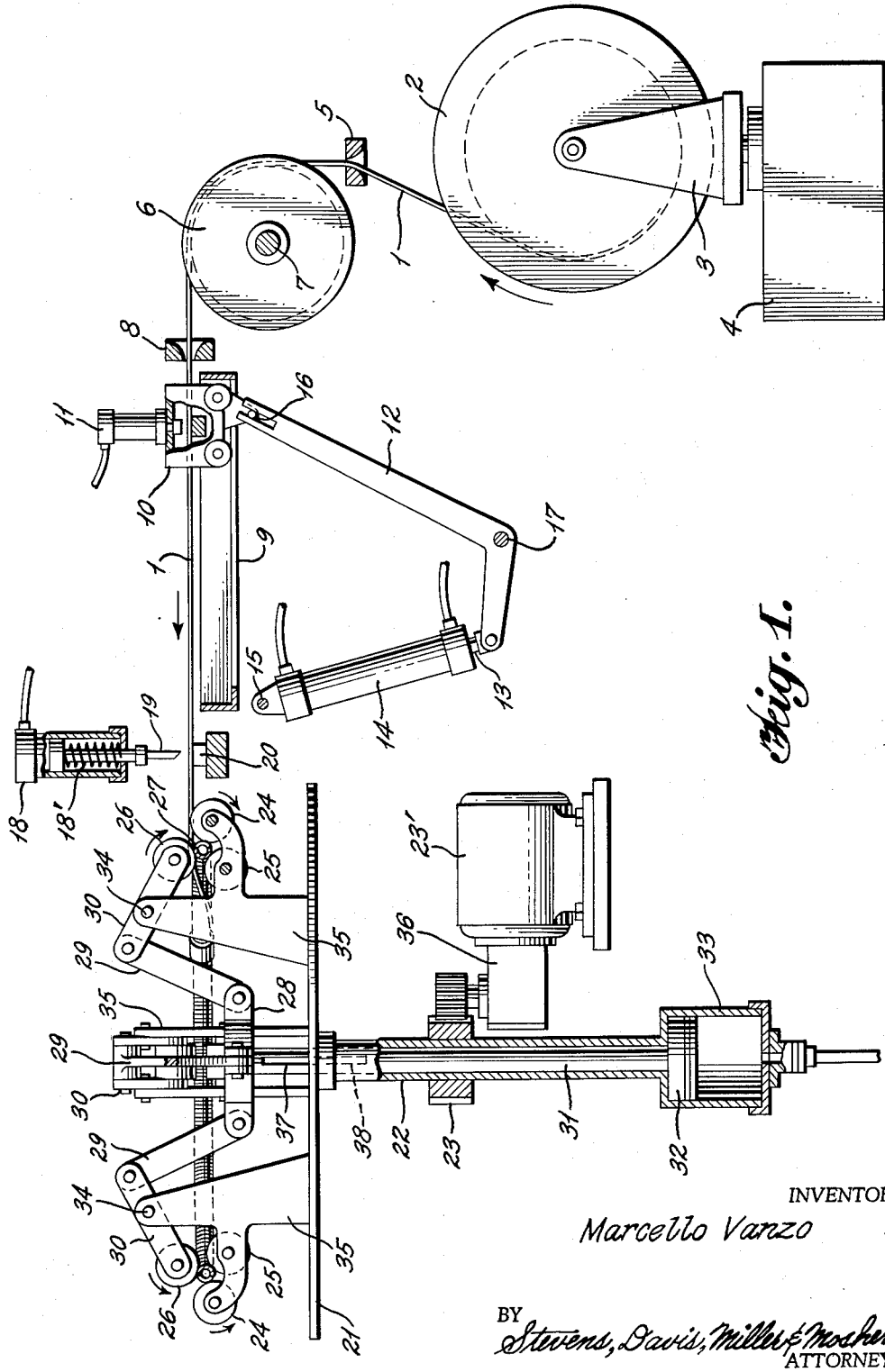

INVENTOR
Marcello Vanzo

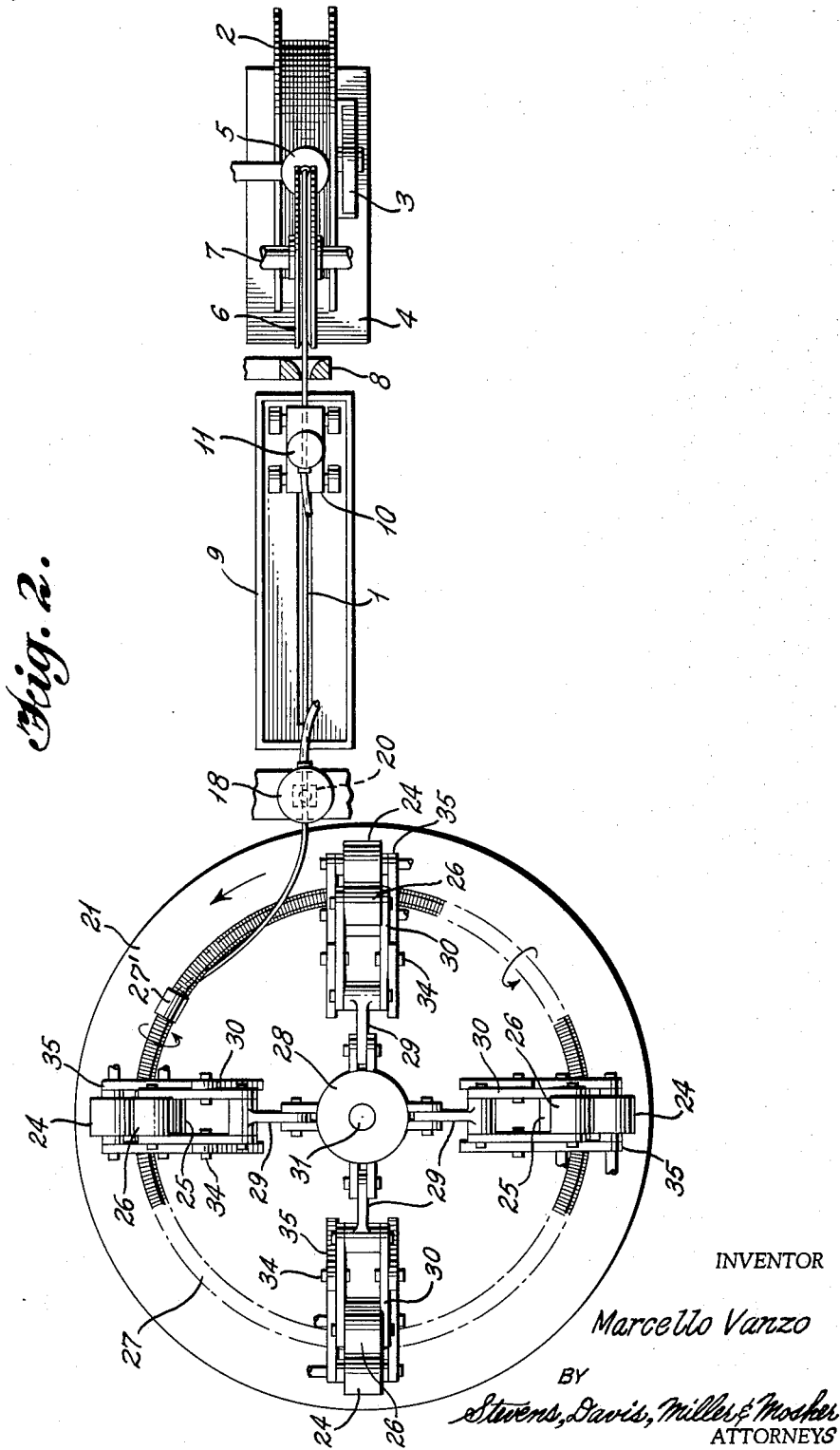

United States Patent Office 3,212,947
Patented Oct. 19, 1965

3,212,947
METHOD AND APPARATUS FOR THE MANUFACTURE OF ANNULAR STRUCTURES HAVING A SINGLE ELEMENTARY OR COMPOSITE CONTINUOUS FILIFORM ELEMENT HELICALLY WOUND ABOUT AN IMAGINARY CIRCULAR AXIS
Marcello Vanzo, Milan, Italy, assignor to Pirelli S.p.A., Milan, Italy
Filed Apr. 16, 1963, Ser. No. 273,413
Claims priority, application Italy, June 20, 1962, 12,395/62
19 Claims. (Cl. 156—136)

The present invention relates to the manufacture of annular structures having a single elementary or composite continuous filiform element helically wound about an imaginary circular axis, and in particular it pertains to the manufacture of twisted-type coreless grommets for reinforcing the beads of pneumatic tires.

It is well known to those skilled in the art, that in the manufacture of pneumatic tires the initial step is to apply to a cylindrical building drum a selected number of plies of rubberized weftless fabric of the "cord" type which is of a width greater than that of the drum.

Metal rings called "bead wires" are applied about the plies, in correspondence of the shoulders of the drum in such a manner as to allow the ply edges to project therefrom. Following this step, the edges of the plies are turned up outwardly of the bead wires in a flipper-like fashion to secure the latter to the central portion of the plies.

The manufacture of large-size tires is carried out on drums provided with shoulders which present, towards the axis of rotation of the drum, two undercuts into which the tire beads are encased. With such an arrangement the beads assume the position they will maintain during the shaping of the cylindrical tire. Accordingly, it is possible to adapt bead wires, as reinforcing elements, having a square or rectangular section, and which can be easily obtained by means of conventional machines, for instance by winding strips, having a given number of metal wires covered with rubber and disposed side-by-side, in superposed coils.

On the other hand, for the manufacture of pneumatic tires of normal size, the building up operation is carried out on drums having rounded shoulders, devoid of undercuts. Consequently since the beads of such tires are practically aligned with the cylindrical plies they are subjected to a rotation about their own axis during the shaping operation before assuming their final position. For reinforcing the beads of the normal tires if bead wires having a shape similar to that of the bead wires for large size tires are used, the edges of the plies wrapped about said wires would be seriously impaired by the corners of these during the rotation of the latter and would considerably compromise the resistance of a very delicate part of the tire. Therefore, it is necessary that the cross section of the bead wires not be provided with corners, but rather that it have a rounded shape. Nevertheless, it is necessary to take into account the fact that in a metallic strand the loss of twisting and the elongation as a function of the load are the less the greater the twisting pitch. As a consequence, although it is impossible to use ideal bead wires constituted by parallel wires, strands having a relatively large pitch can be advantageously adapted.

Heretofore, strands having a large pitch were handmade by starting from a core having a metallic continuous ring about which a thread was helically wound to partially cover the core. Bead wires so produced were, of course, expensive due to the length of time spent in making them by hand. Moreover, the pitch of the helices of the thread was not only closely constant at each turn, as desirable, inasmuch as their uniformity depended upon the personal skill of the operator.

An object of the present invention is a new and economical method for automatic and continuous manufacture of annular structures having a single filiform element, either elementary or composite, helically wound about an annular provisional flexibile core, the latter being permanently removed at the end of the operation.

Briefly summarized the filiform element is at first paid off from the bobbin upon which it is wound by imparting to it a rotation about its own axis, and its free end is secured to the periphery of a continuous flexible ring of circular cross section, having a movement of rotation about its own axis of symmetry and a movement of rotation about an axis passing through the centers of its cross sections, and this drags the filiform element into rotation whereby the latter winds up on the core so as to constitute helices of predetermined number and pitch. After a prescribed number of turns of the ring about its own axis of symmetry, the filiform element wound up upon it is separated from the bobbin, the ring is opened and unthreaded from the resulting structure and the two ends of the wound filiform elements are butt jointed by means of a sleeve or of any other suitable means.

A further object of the present invention is the provision of a simple device, easily used, constituting a practical means of practicing of the above described method in a continuous and automatic manner.

The details of the method and of the device forming the object of the present invention will be more clearly understood from the following description, made with reference to the attached drawing, which represents by way of example the best mode presently contemplated for practicing the method of the invention.

In the drawings:

FIG. 1 is a diagrammatic elevation view of an apparatus for the manufacture of an annular structure constituted by a single filiform element helically wound about a circular axis; and FIG. 2 is a top diagrammatical view of the apparatus illustrated in FIG. 1, certain details having been omitted for the sake of clarity.

The metallic wire 1 for the manufacture of the annular structure is wound up on a bobbin 2 having a horizontal axis, and supported by an arm 3 rotatable about a vertical axis controlled by a motor, not shown in the drawing, through suitable gears encased in the base 4. Coaxially with the axis of rotation of the arm 3 there is a wire-guide 5, the vertical bore of which is tangent to the race of an idle driving pulley 6 mounted in a fixed pivot 7.

A second wire guide 8 is provided with a horizontal bore tangent to the race of the pulley 6 at its highest point.

On a horizontal guide 9 there is slidably assembled a carriage 10 bearing a compressed-fluid cylinder 11 which slidably receives a piston capable of stopping the wire in the carriage 10.

To impart reciprocal sliding movement to the carriage 10 along the guide 9, there is provided a bell crank lever 12, the lower end of which is pivotally connected to the piston rod 13 of a piston slidable in a double-acting cylinder 14 pivoted at a fixed point 15.

The upper end of the lever 12 is bifurcated and slidably carries a shoe 16 pivoted on a projection of the carriage 10. The lever 12 is also pivoted at an intermediate fixed point 17. A compressed fluid cylinder 18 controls the vertical movement of a blade 19 towards an anvil 20, opposing the action of a helicoidal spring 18' housed within cylinder 18.

A revolving platform 21 is fixed on the upper end of a hollow shaft 22, onto which there is keyed a gear 23, indirectly controlled by a motor 23'. The revolving platform 21 carries several sets of rollers, disposed at equal spaced intervals along a circumference, each set comprising two rollers 24 and 25 in a fixed position and a roller 26, the latter being movable away from and towards the rollers 24 and 25. Between the rollers there is clamped a core 27 comprising a continuous flexible ring having circular section and in the form of a helicoidal spring having coils disposed in side-by-side relationship and provided with means 27' permitting it to be opened and closed and to clamp one end of the wire to be helically wound. All the rollers 24, 25 and 26 are controlled at an equal tip speed and their sense of rotation is such that the flexible ring 27 is rotated in a given direction about an axis passing through the centers of its cross sections. Conventional means for driving the rollers are not shown in FIG. 1, for the sake of clarity.

In order to dispose the flexible ring 27 between the rollers 24, 25 and 26, the rollers 26 are movable from the position indicated in FIG. 1 and are returned to such position by means of a linkage comprising the linkage arms 28, 29 and 30, actuated by a rod 31 slidably mounted in the hollow shaft 22 and is raised by means of a piston 32 slidable within the compressed-fluid cylinder 33. The rod 31, during rotation, is integral with the hollow shaft 22 by virtue of a longitudinal keyway 37 and key 38. The arms 30 are pivotally connected at an intermediate point 34 to the supports 35.

In practicing the method of producing helically wound annular structures in accordance with the present invention utilizing the apparatus described above, the wire 1 is paid off from the bobbin 2 assembled on a support 3 rotatable about a vertical axis. Thus the wire 1 is forced to rotate about its own axis and therefore to become untwisted. The wire 1 is then passed through the guide 5 on the pulley 6 and through the guide 8 to the carriage 10, where it is clamped by actuating downwardly the piston contained in the cylinder 11. Next, compressed fluid is injected in the cylinder 14 from the top end, and the bell crank lever 12 rotates about the fixed pivot 17, moving the carriage 10 towards the left side of FIG. 1.

The carriage 10 delivers the wire to the revolving platform 21 and is returned to its original position, after the end of the wire has been secured to the periphery of the flexible ring 27, in response to discharge of compressed fluid from the cylinders 11 and 14 and to the introduction of compressed fluid through the bottom end of the cylinder 14. The flexible ring 27 is carried into rotation by the revolving platform 21, and also rotates about an axis passing through the centers of its cross sections by means of the set of controlled rollers 24, 25 and 26, between which it is clamped. The wire is consequently forced to wind helically about the flexible ring 27, the pitch of these helices depending upon the ratio between the speed of rotation of the flexible ring 27 about its axis of symmetry and the speed of rotation of the peripheral points of the flexible ring about the axis passing through the centers of the cross sections of the same.

When the platform 21 has completed a predetermined number of turns, the wire 1 is separated from the bobbin 2 by injecting compressed fluid from the top end of the cylinder 18 thus causing displacement of the blade 19 against the anvil 20.

Simultaneously with the injection of compressed fluid in the cylinder 18, compressed fluid is injected in the cylinder 11 to clamp the wire in the position it has at that moment.

After cutting the wire, the compressed fluid is discharged from the cylinder 18 and the blade 19 is raised by means of the helicoidal compressed spring contained in the lower portion of the cylinder 18, while the cylinder 11 remains under pressure.

In order to remove the flexible ring 27 from the rollers 24, 25 and 26, compressed fluid which had been injected at the beginning of the working cycle in the lower portion of the cylinder 33, is discharged, and the piston 32 returns to its low position by gravity. The arms 30 rotate about the pivots 34 and the rollers 26 are directed to the center of the revolving platform in order to allow the removal of the flexible ring 27. Then the means 27' which closes the continuous ring 27 is opened in order to allow withdrawal of the latter from the helically wound annular structure obtained by means of the above described helical winding the wire 1. The two ends of the wire are butt jointed by threading them in the two ends of a suitable sleeve. In this way a structure constituted by a single continuous wire helically wound about an imaginary circular axis, and devoid of any core, is obtained.

In the manufacture of reinforcing bead wires for the beads of pneumatic tires it is advisable to select for the helices such a pitch that the helices obtained by winding up the wire in the next turns be disposed side-by-side with respect to those obtained in the preceding turn and moreover that along the flexible ring there may be portions covered by the side-by-side helices alternated with portions in which said ring is left bare.

Furthermore, it can be advantageous to provide a motor which controls the rotation of the revolving platform with a speed variator 36, so that, after each turn of the platform, the ratio between the speed of rotation of the flexible ring about its own axis of symmetry and the speed of rotation of the peripheral points of said flexible rings about the axis passing through the centers of the cross sections of the same may be increased in order to take into account the increase of thickness of the core about which the wire is wound up in consequence of the helices previously wound about said flexible continuous ring.

The above described method is advantageous for the following reasons:

It is practically continuous and automatic;

It ensures the greatest regularity and constancy in the features of the obtained product;

It allows a high output per hour and therefore is very advantageous from an economical standpoint.

What is claimed is:

1. A method of producing annular structures having a filiform element helically wound about an imaginary circular axis comprising the steps of securing one end of said filiform element to a peripheral point of a flexible continuous ring having a generally circular cross section, simultaneously imparting a movement of rotation to said ring about its own axis of symmetry and a further movement of rotation about an axis passing through the centers of its cross sections whereby said filiform element is dragged into rotation and is helically wound about said ring, and removing the ring from the resultant annular structure.

2. A method as in claim 1, said ring being rotated about its own axis of symmetry at least twice.

3. A method as in claim 2, including selecting a pitch for the helices by winding the filiform element whereby one turn is disposed in side-by-side relationship with respect to the preceding turn.

4. A method as in claim 3, including the step of winding the filiform element whereby portions of the helices of the filiform element cover said ring and alternate portions of said ring are left bare.

5. A method as in claim 2, including varying the ratio between the speed of rotation of said ring about its own axis of symmetry and the speed of rotation of the peripheral points of said ring about the axis passing through the centers of its cross sections.

6. A method as in claim 2, including increasing at each subsequent turn of said ring about its own axis of symmetry the ratio between the speed of rotation of the ring about the axis of symmetry and the speed of rotation of the peripheral points of the ring about the axis passing through the centers of the cross sections of the same.

7. A method as in claim 2, wherein said filiform element, before being secured to the periphery of said ring is caused to rotate about its own axis in a sense opposite to that according to which it is subsequently helically wound about said ring.

8. A method as in claim 1 wherein the opposite ends of said filiform element constituting the helically wound structure are butt jointed.

9. An apparatus for producing annular structures having a filiform element helically wound about an imaginary circular axis comprising storage means for said filiform element, an annular structure forming means comprising a revolving platform, a flexible ring, motive means on said revolving platform for supporting and rotating said ring about an axis passing through its centers of cross sections, means for simultaneously rotating said ring and said platform about their axes of symmetry, feeding means to feed said filiform element from said storage means to a peripheral point on said ring, and means for securing one end of said filiform element to said point on said ring.

10. Apparatus as in claim 9, said means for rotating said flexible ring about the axis passing through the centers of its cross sections having a plurality of controlled rollers, each roller rotating about its own axis at an equal peripheral speed.

11. Apparatus as in claim 10, wherein said means for rotating said flexible ring about the axis passing through the centers of its cross sections includes sets of controlled rollers, each roller rotating about its own axis at the same peripheral speed and being disposed at equal intervals along the circumference of the ring, each set of rollers comprising a pair of fixed rollers and a roller displaceable with respect to the corresponding pair of fixed rollers at such a distance therefrom as to allow the insertion and the subsequent removal of the flexible rings from the fixed rollers, means being moreover provided to displace the movable rollers relative to the corresponding pairs of fixed rollers.

12. Apparatus as in claim 9, including means for actutaing said movable rollers with respect to the corresponding pair of fixed rollers, said actuating means comprising a fluid actuated cylinder operatively connected to said movable rollers.

13. Apparatus as in claim 9, wherein means are provided to impart rotation of said filiform element about its own axis in a sense opposite to that according to which said element subsequently winds up about said flexible ring.

14. Apparatus as in claim 13, said means for imparting rotation of said filiform element about its own axis comprising an upright arm which supports a bobbin having horizontal axis for the supply of the filiform element, said arm being keyed on a rotatable and controlled vertical shaft.

15. Apparatus as in claim 9, wherein means are provided to bring the free end of the filiform element into engagement with a peripheral point on the continuous flexible ring to which it is to be secured.

16. Apparatus as in claim 15, wherein said means to bring said filiform element into engagement with said flexible ring comprises a carriage bearing a device for clamping the filiform element, said carriage being actuated along a guide alternatively to and fro with respect to said flexible ring.

17. Apparatus as in claim 9, including means to separate the length of filiform element necessary for the manufacture of said annular structure from the supply source to said flexible ring.

18. Apparatus as in claim 17, said means for separating said filiform element from the supply source comprises a cutter actuated by compressed fluid.

19. Apparatus as in claim 9, comprising means for varying the ratio between the speed of rotation of said flexible ring about its own axis of symmetry and the speed of rotation of the peripheral points of said ring about an axis passing through the centers of the cross sections of the ring.

References Cited by the Examiner

UNITED STATES PATENTS

| | | | |
|---|---|---|---|
| 626,998 | 6/99 | Hubbard | 156—422 |
| 1,294,160 | 2/19 | Pratt | 245—1.5 |
| 1,348,615 | 8/20 | Young | 245—1.5 |
| 1,522,797 | 1/25 | Beyea | 245—1.5 |
| 1,522,798 | 1/25 | Beyea | 245—1.5 |
| 1,738,018 | 12/29 | Pfeiffer et al. | 156—422 |
| 2,753,678 | 7/56 | Hansen et al. | |

EARL M. BERGERT, *Primary Examiner.*